(12) United States Patent
Oberheide et al.

(10) Patent No.: US 6,782,776 B2
(45) Date of Patent: Aug. 31, 2004

(54) ADJUSTABLE PEDAL MECHANISM FOR A MOTOR VEHICLE

(75) Inventors: G. Clarke Oberheide, Troy, MI (US); Andrei Tchernyl, Etobicoke (CA); Nebojsa Djordjevic, Toronto (CA); Gordon Andrew Paton, Sharon (CA); Kristopher B. Rogers, Toronto (CA)

(73) Assignees: 2000662 Ontario Inc., Aurora (CA); Intier Automotive Closures Inc., Newmarket (CA)

( * ) Notice: Subject to any disclaimer, the term of this patent is extended or adjusted under 35 U.S.C. 154(b) by 0 days.

(21) Appl. No.: 10/129,175

(22) PCT Filed: Apr. 9, 2001

(86) PCT No.: PCT/CA01/00494

§ 371 (c)(1),
(2), (4) Date: May 3, 2002

(87) PCT Pub. No.: WO01/76924

PCT Pub. Date: Oct. 18, 2001

(65) Prior Publication Data

US 2003/0056615 A1 Mar. 27, 2003

(51) Int. Cl.[7] ................................................. G05G 1/14
(52) U.S. Cl. ........................................................ 74/512
(58) Field of Search .......................... 74/512, 513, 514, 74/560, 561, 562, 562.5, 563

(56) References Cited

U.S. PATENT DOCUMENTS

| 4,875,385 | A | * | 10/1989 | Sitrin | 74/512 |
| 5,722,302 | A | | 3/1998 | Rixon et al. | 74/512 |
| 5,819,593 | A | | 10/1998 | Rixon et al. | 74/514 |
| 5,855,143 | A | | 1/1999 | Ewing | 74/512 |
| 5,884,532 | A | | 3/1999 | Rixon et al. | 74/512 |
| 6,289,761 | B1 | * | 9/2001 | Reynolds et al. | 74/512 |
| 6,360,629 | B2 | * | 3/2002 | Schambre et al. | 74/512 |

* cited by examiner

Primary Examiner—David A. Bucci
Assistant Examiner—Bradley J. Vanpelt
(74) Attorney, Agent, or Firm—Clark Hill PLC (57) ABSTRACT

An adjustable pedal assembly for a motor vehicle includes a bracket for mounting the adjustable pedal assembly to the motor vehicle. A pivot link is pivotally mounted to the bracket. The pivot link has a first guide slot and a first pin. A pedal is pivotally secured to the pivot link and includes an arm. The arm has a second guide slot and a second pin. The second guide slot works in conjunction with the first pin whereas the first guide slot works in conjunction with the second guide pin. Together, these pairings define the relative movement between the pivot link and the pedal arm. A drive assembly extends between said first pin and said second pin. The drive assembly slides the pedal arm relative to the pivot link to extend and retract the pedal with respect to the operator.

8 Claims, 13 Drawing Sheets

ADJUSTABLE PEDAL MECHANISM FOR A MOTOR VEHICLE

FIELD OF THE INVENTION

The invention relates generally to a pedal mechanism for a motor vehicle. More specifically, the invention relates to a pedal mechanism having a position that may be adjusted with respect to the passenger compartment.

BACKGROUND OF THE INVENTION

Operators of motor vehicles must be comfortable and feel safe in the motor vehicle in which they are operating. In some instances, the operator or driver of the motor vehicle must move the driver's seat forward toward the steering wheel to facilitate the operators operation of the throttle, brake and clutch pedals with the operator's feet. Moving the driver's seat to such an extreme forward position may provide discomfort to the operator because the operator may be too close to the steering wheel.

Likewise, if an operator should have long legs, the operator must move the driver's seat back away from the steering wheel to operate the pedals correctly. Such a position may require the operator to reach forward to grasp the steering wheel. In addition, the driver's seat may be located so far back from the steering wheel that the functionality of the space behind the driver's seat is reduced.

U.S. Pat. No. 5,078,024, issued to Cicotte et al. on Jan. 7, 1992, discloses an apparatus that attempts to alleviate the aforementioned situations. This patent discloses an adjustable pedal assembly including a pedal having a pedal arm, an adjustor member and a bracket. The bracket is secured to the motor vehicle and the adjustor member and pedal arm move with respect to the bracket. A drive mechanism including a motor and a drive screw move the pedal arm with respect to the bracket in a sliding motion moving the pedal arm forward and/or rearward. The adjustor member pivots with regard to the pedal arm as the pedal arm moves axially to prevent the brake assembly from treating such sliding movement as a change in position resulting in an application or release of the brake. This assembly requires many pins and slots to accommodate the lateral movement of the pedal arm while preventing the actual engagement of the mechanism controlled thereby. More specifically, the adjustor member is required in this assembly to prevent the inaccurate application of the brake due to axial position adjustment of the pedal arm.

SUMMARY OF THE INVENTION

An adjustable pedal assembly for a motor vehicle is disclosed. The adjustable pedal assembly includes a bracket for mounting the adjustable pedal to the motor vehicle. The adjustable pedal assembly also includes a pivot pin. The pivot link is pivotally mounted to the bracket. The pivot link has a first guide slot and a first pin. The adjustable pedal assembly also includes a pedal having an arm. The arm has a second guide slot and a second pin. The second guide slot receives the first pin in sliding engagement. The first guide slot receives the second pin in sliding engagement. The adjustable pedal assembly includes a drive extending between the first pin and the second pin. The drive is operable to effect sliding relative movement of the pedal arm relative to the pivot link to extend and retract the pedal.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Referring to FIGS. 1 through 6, one embodiment of an adjustable pedal assembly is generally indicated at 10. The adjustable pedal assembly 10 is used in a motor vehicle 12. The motor vehicle 12 is shown cut away in the FIGS. 7 and 8 only for purposes of simplicity. The adjustable pedal assembly 10 may include a single pedal 14, a pair of pedals 14, 16 or a set of three pedals (not shown in the Figures). As may be appreciated by those skilled in the art, the first pedal 14 is a brake, the second pedal 16 is a throttle and the third pedal would be a clutch. Again, for purposes of simplicity, the invention will be described in terms of one 14 of the three pedals as the structure for all pedals is similar.

The first pedal 14 is a brake for a motor vehicle 12. The brake cable is secured to a control pin 18. The first pedal 14 includes a bracket 20. The bracket 20 his fixedly secured to the motor vehicle 12. The bracket 20 may be secured to the firewall 12 separating the passenger compartment from the engine compartment. Or, in the alternative, the bracket 20 may be secured to a structure extending down from a structure disposed adjacent to firewall.

A pivot link 22 is secured to the bracket 20. The pivot link 22 is secured in a manner allowing it to pivot with respect to the bracket 20. The pivoting action between the pivot link 22 in the bracket 20 defines the control of the brake by the movement of the first pedal 14 which, in turn, moves the control pin 18. The pivot link 22 pivots about to a pivot point 24, defined by any suitable fastener capable of securing the pivot link 22 to the bracket 20 while providing a pivoting movement therebetween.

In the embodiment shown in the Figures, the pivot link 22 depends from the pivot point 24. The pivot link 22 defines a first guide slot 26 having a first longitudinal axis 28. The first guide slot 26 extends through an oblique angle with respect to the horizontal plane. The pivot link 22 also includes a first pin 30. The first pin 30 extends through a hole in the pivot link 22. The first pin 30 does not move axially with respect to the pivotal link 22.

The first pedal 14 defines an arm 32 extending between a slot end 34 and the distal end 36. A pad 38 is secured to the distal end 36 and is designed to receive the foot of an operator to operate the pedal 14. The arm 32 defines a first portion 40 and a second portion 42. The first portion 40 is disposed adjacent the slot end 34, whereas the second portion 42 extends from the first portion 40 to the distal end 36 thereof. Taken from a side view perspective, the first 40 and second 42 portions are not coaxial. Together, the first 40 and second 42 portions define an oblique angle. The first portion 40 of the arm 32 defines a second guide slot 44. The second guide slot 44 defines a second longitudinal axis 46. The second guide slot 44 is designed to receive the first pin 30 therein. The first pin 30 travels along the second guide slot 44 allowing the arm 32 of the pedal 14 to move relative to the pivot link 22.

The arm 32 of the pedal 14 also includes a second pin 48. The second pin 48 is secured to the arm 32 in the second portion 42 thereof. The second pin 48 does not move axially with respect to the arm 32. The second pin 48 only rotates with respect to the arm 32. Further, the second pin 48 is received within the first guide slot 26. The second pin 48 moves along the first guide slot 26 complementing the movement of the first pin 30 through the second guide slot 44. The combination of the first pin 30 in moving through the second guide slot 44 and the second pin 48 moving through the first guide slot 26 allows the arm 32 of the pedal 14 to move with respect to the pivot link 22 in a manner that moves the pad 38, fixedly secured to the distal end 36 of the arm 32, between an extended position and a retracted position. The relative position of the pad 38 is changed with respect to the operator and the control pin 18. More specifically, the movement of the arm 32 and the pad 38 does not result in the axial movement of the control pin 18. This feature eliminates the need for lost motion plates discussed in the related art above because the tension in the brake cable or connection is not changed with the change in position of the pad 38.

The adjustable pedal assembly 10 also includes a drive assembly, generally shown at 50. The drive assembly 50 slides the arm 32 with respect to the pivot link 22 to position the pad 38 where desired. The drive assembly 50 is selectively operated by the operator using a switch (not shown) to extend and retract the arm 32 with respect to the pivotal link 22.

The drive assembly 50 includes a motor 52. The motor 52 is a bidirectional electric motor that can rotate in either direction based on the position of the switch used to control same. A gear assembly 54 is secured to the output shaft (not shown) of the motor 52. The gear assembly 54 will be discussed in greater detail subsequently with respect to FIGS. 7 and 8.

Extending out from the gear assembly 54 is a flexible core element 56. The flexible core element 56 receives the rotational output received from the gear assembly 54 and transmits the rotational output through a curved path. The flexible core element 56 is covered with a sheath 57 and includes an output end 58. The flexible core element 56 continues to transmit the rotational output of the gear assembly 54 even though the curved path through which the flexible core element 56 traverses may change during the transmission of the rotational output. More specifically, the flexible core element 56 provides a link between the gear assembly 54 and the output of the flexible core element 56 even though the orientation and position of the output end 58 of the flexible core element 56 may change.

A drive screw 60 is connected to the output end 58 of the flexible core element 56. The drive screw 60 rotates when it receives the rotational output provided by the flexible core element 56. The drive screw 60 extends through and is mounted to the first pin 30. In may be appreciated by those skilled in the art of that they suitable pushing may extend between the drive screw 60 in the first pin 30 allowing the drive screw 60 to rotate freely within the first pin 30. The drive screw 60 does not move axially with respect to the first pin 30.

The drive screw 60 includes a shaft 62 defining a threaded portion 64. The threaded portion 64 extends into and through the second pin 48. The drive screw 60 threadingly engages the second pin 48 such that the second pin 48 travels along the threaded portion 64 of the drive screw 60 when the drive screw 60 is rotated. The movement of the second pin 48 along the drive screw 60 provides the relative position between the first 30 and second 48 pins. The relative position of the first 30 and second 48 pins defines the relationship of the arm 32 with respect to the pivotal link 22. More specifically, as the second pin 48 travels along the drive screw 60, the first pin 30 slides through the second guide slot 44 and the second pin 48 slides along the first guide slot 26. The sliding motion to of the pins 30, 48 through the guide slots 26, 44 results in the pad 38 and arm 32 extending and retract in with respect to the position of the operator.

Figure 1:
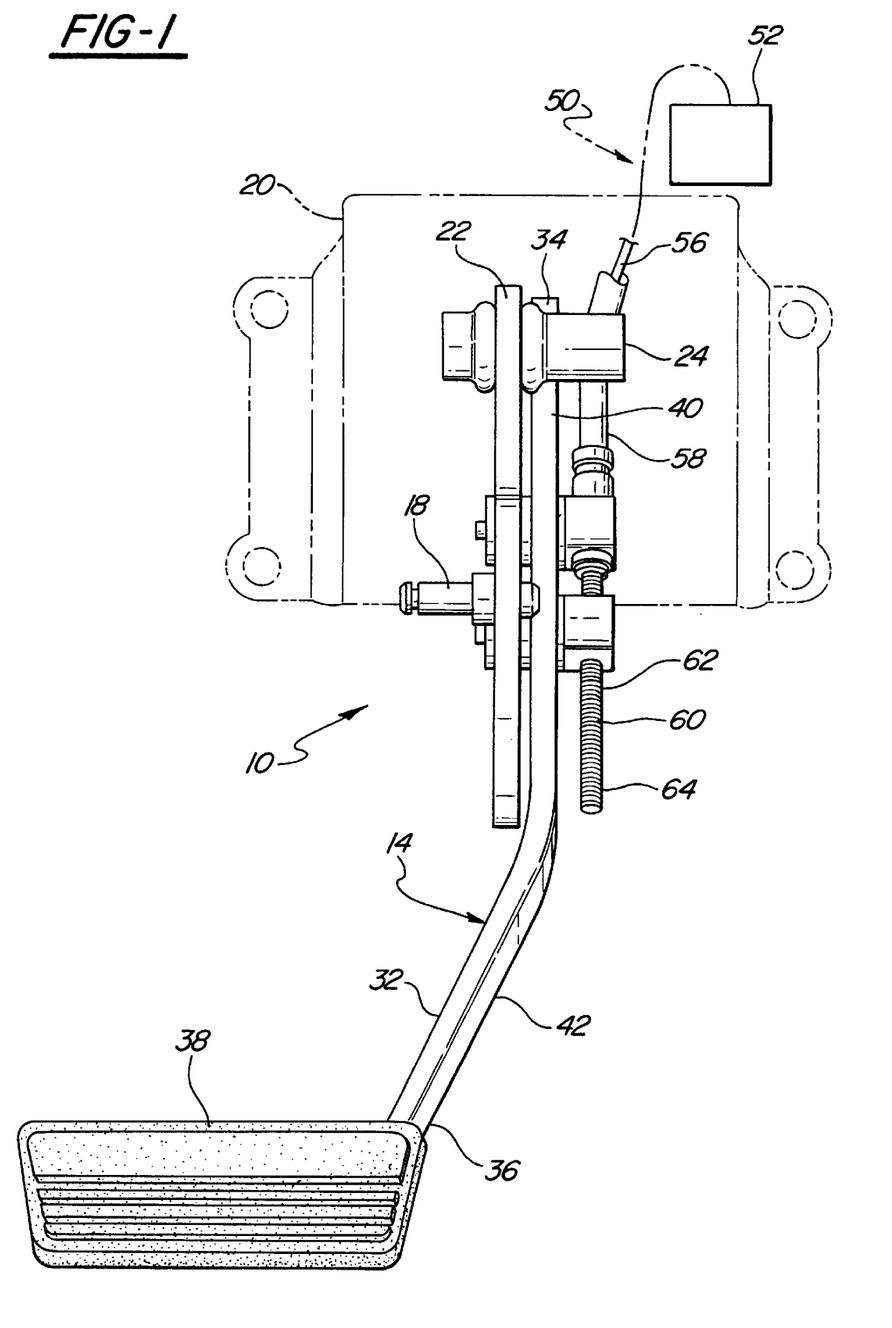
FIG. 1 is a front side view of a pedal assembly incorporating one embodiment of the invention.
Figure 2:
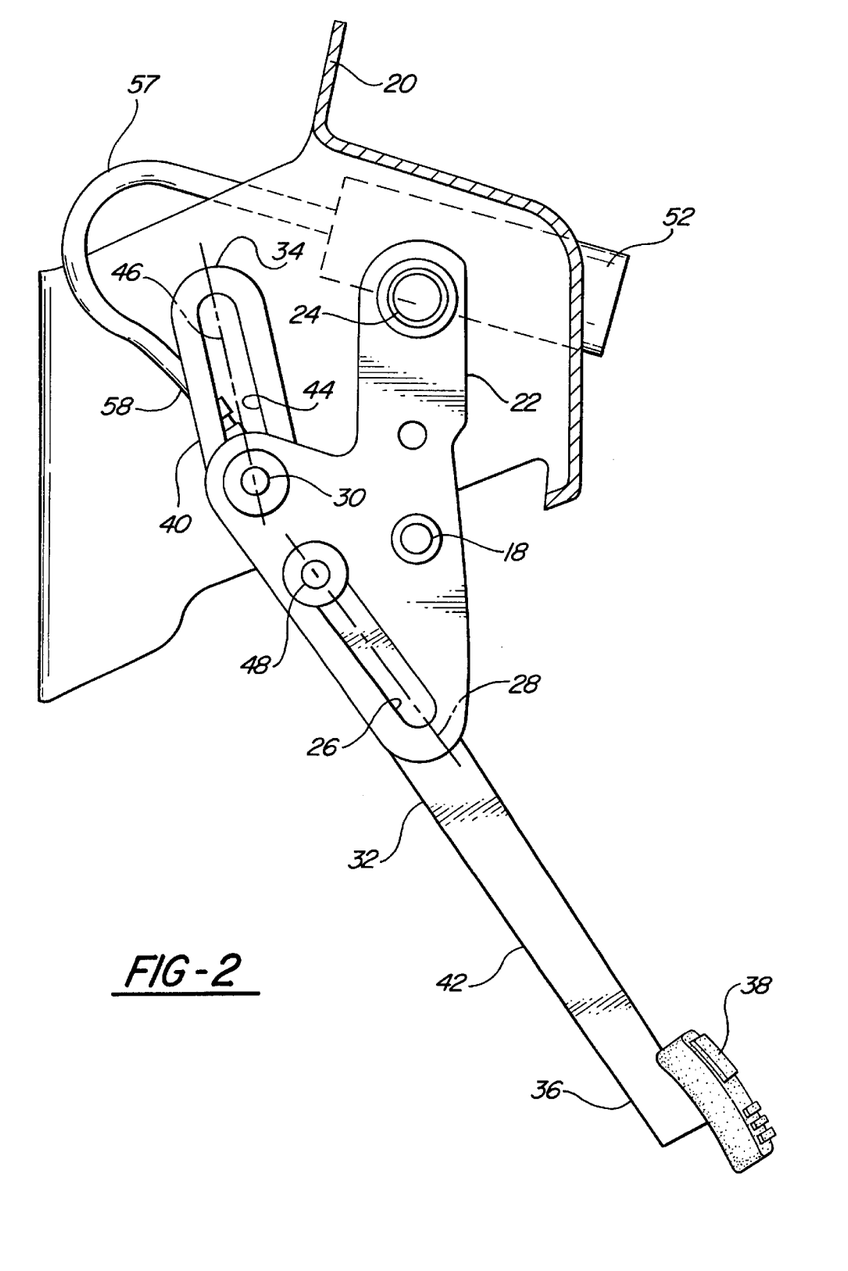
FIG. 2 is a side view of a pedal assembly incorporating the embodiment of an actuator for the invention.
Figure 3:
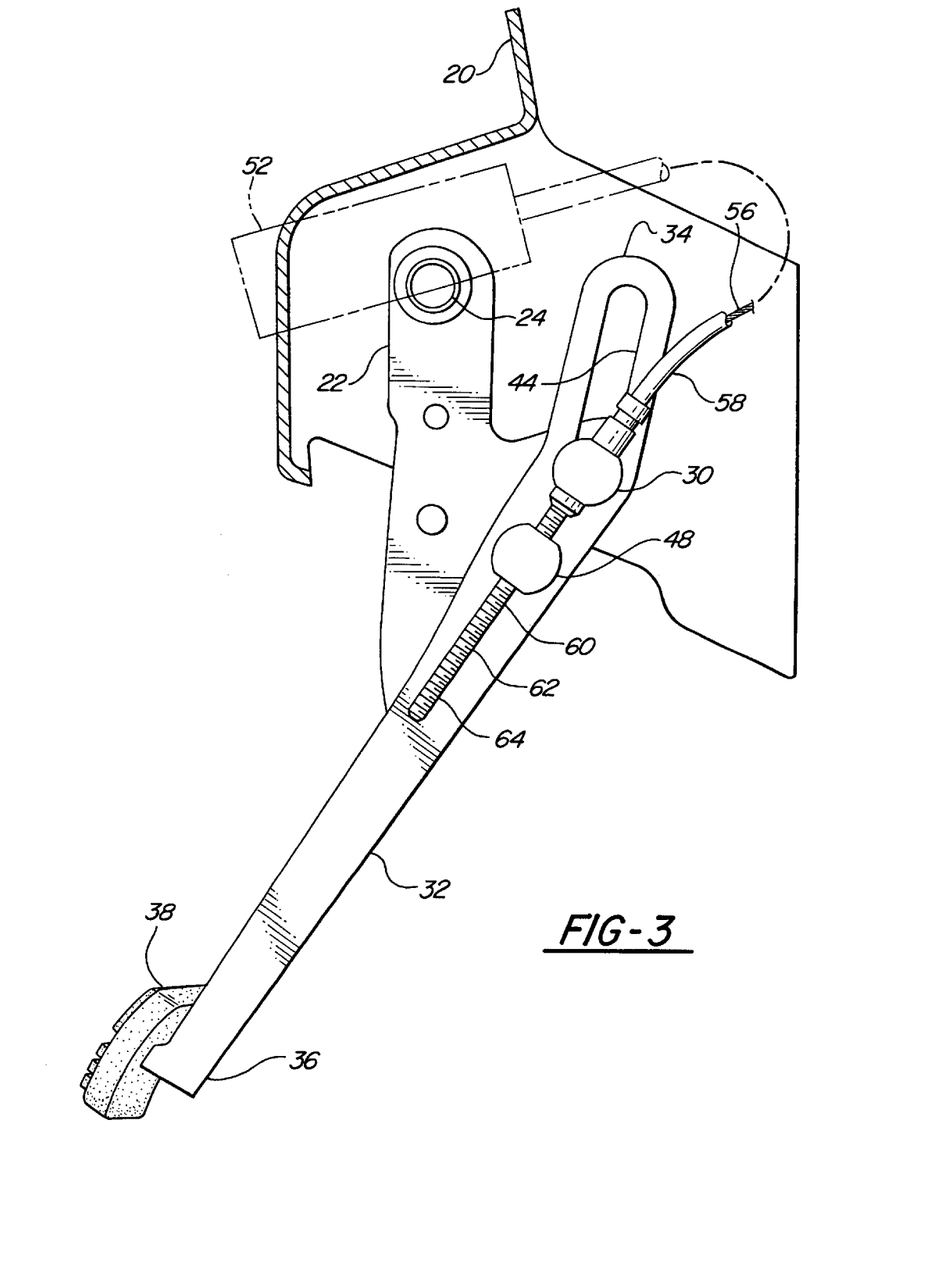
FIG. 3 is a second side view of a pedal assembly incorporating the embodiment of the invention.
Figure 4:
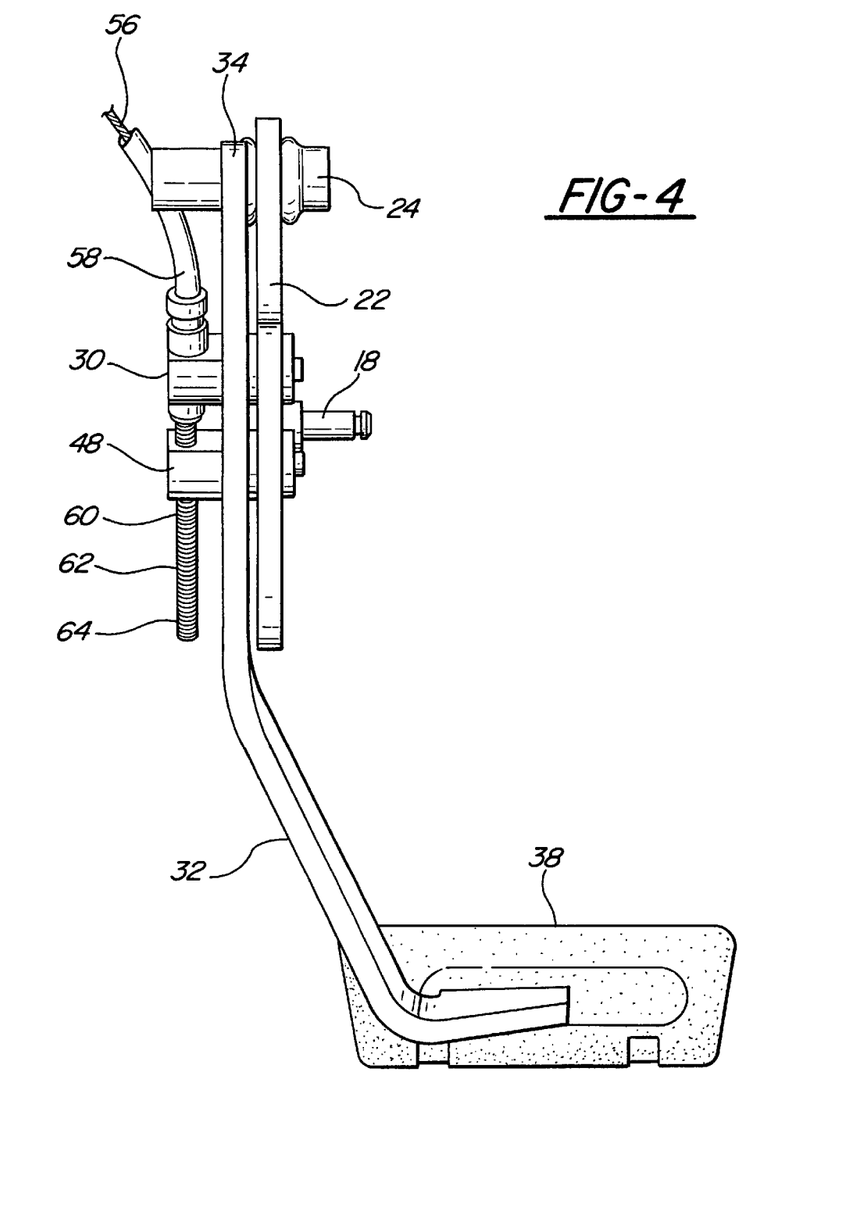
FIG. 4 is a back side view of a pedal assembly incorporating one embodiment of the invention.
Figures 5, 6:
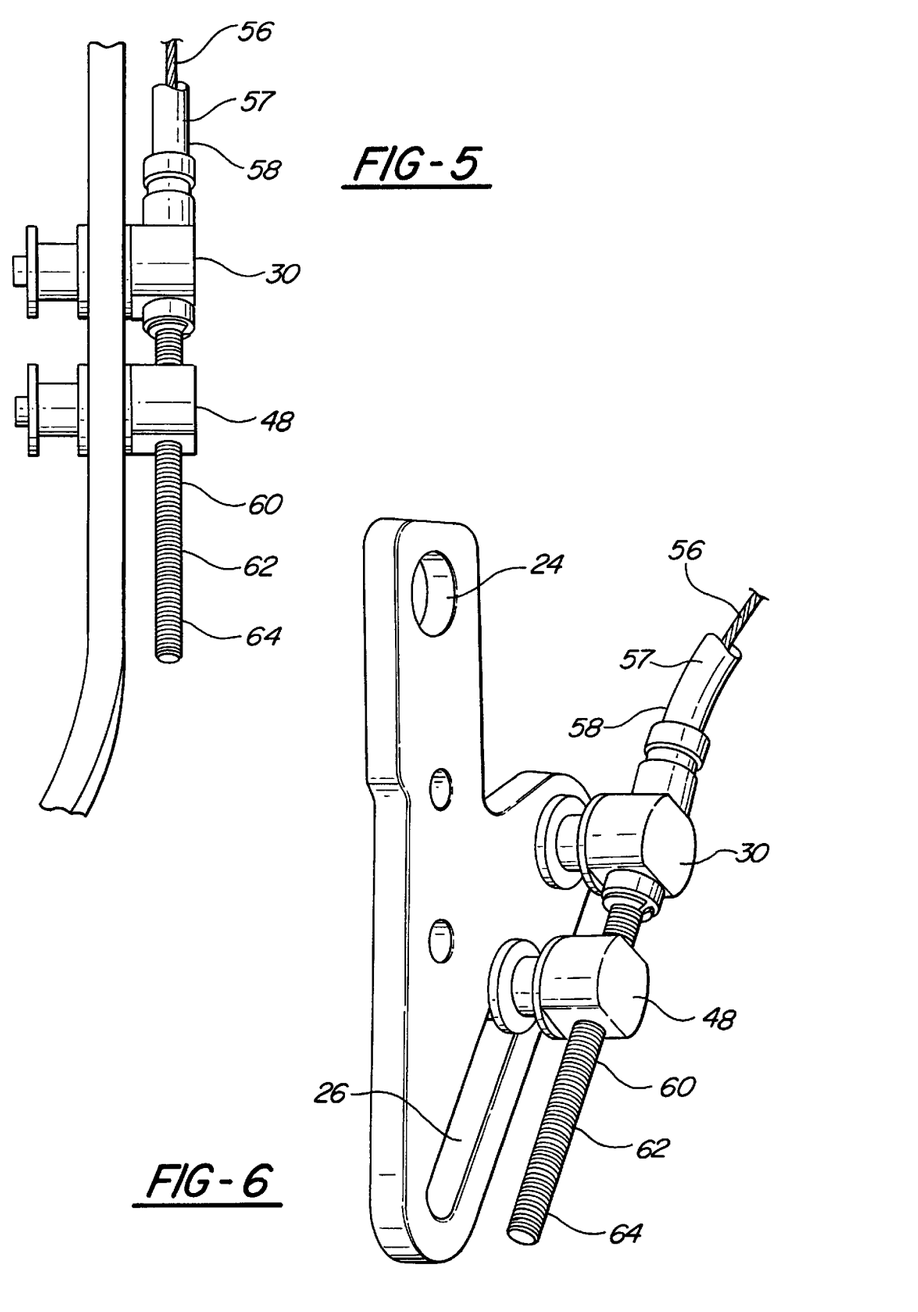
FIG. 5 is a perspective view, partially cut away, of one embodiment of the invention with the bracket and pivot link removed.
FIG. 6 is a perspective view, partially cut away of one embodiment of the invention with the pedal arm and the bracket removed.
Figure 7:
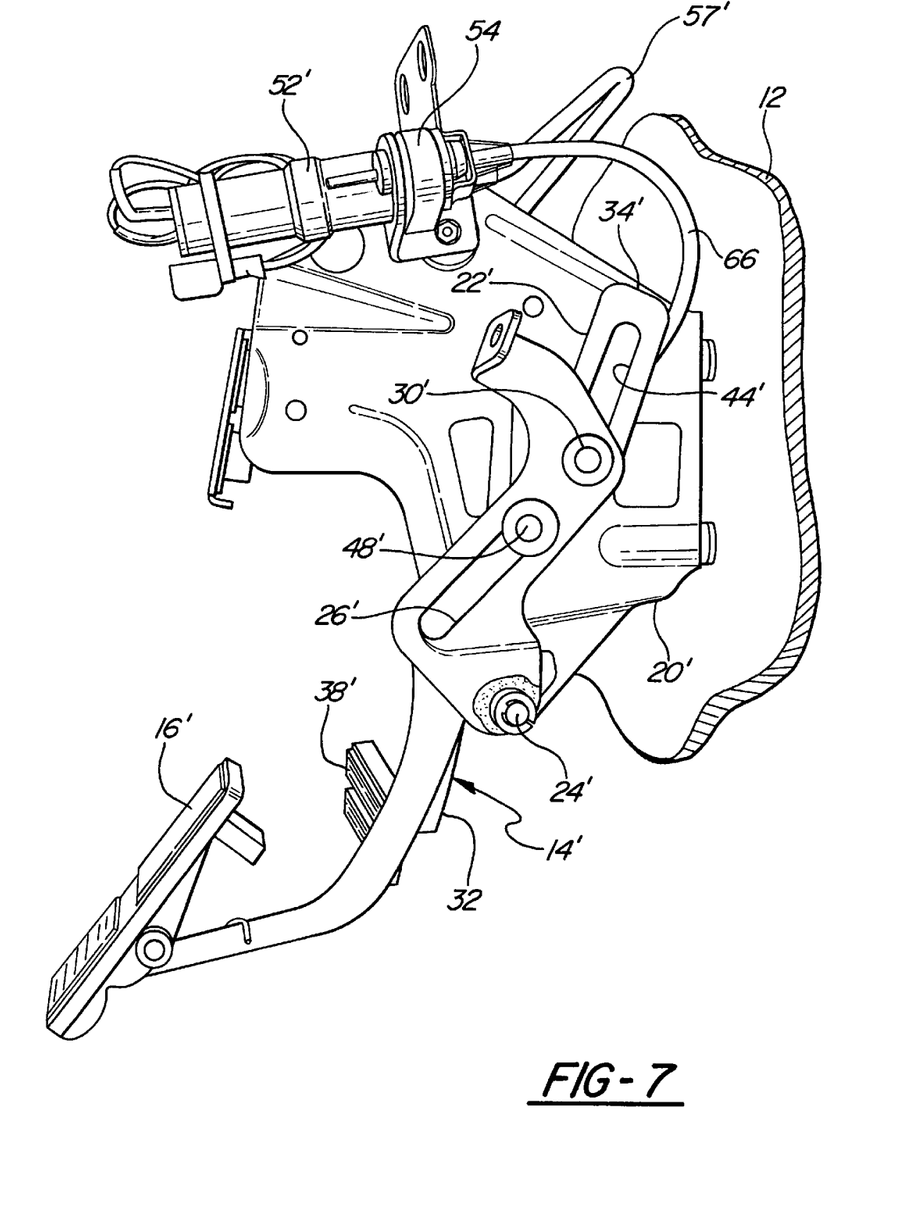
FIG. 7 is a perspective view of a second embodiment of the invention.
Figure 8:
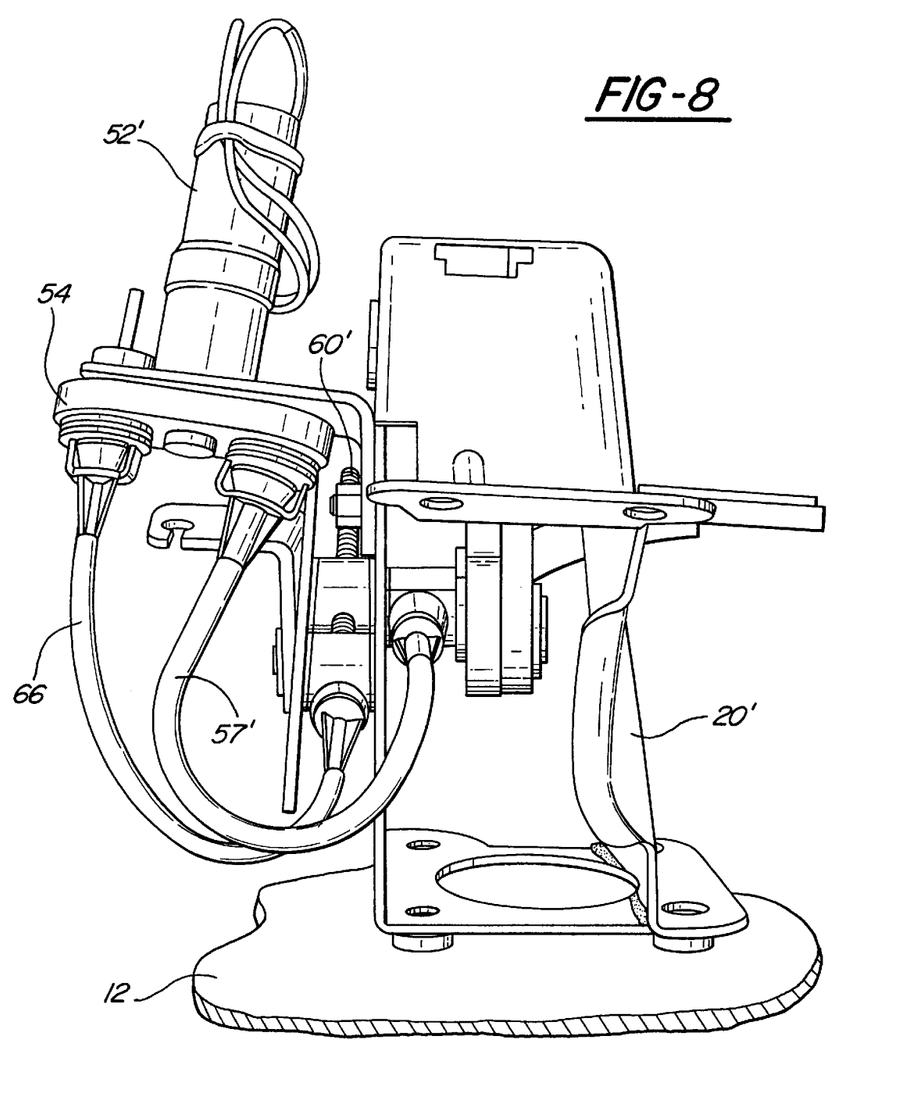
FIG. 8 is a top view of the second embodiment of the invention.

Turning attention to FIGS. 7 and 8, a second embodiment, wherein like primed numerals represent similar structure to that of the embodiment shown in FIGS. 1 through 6, the gear assembly 54' of the second embodiment includes a second flexible core element 66 may extend thereout. The second flexible core element 66 transmits rotational output of the motor 52' to drive a second drive screw (not shown) which would move the second pedal 16. The gear assembly 54' is designed such that the rotational output of the second flexible core element 66 is equal to the output of the first flexible core element 56'.

Figure 9:
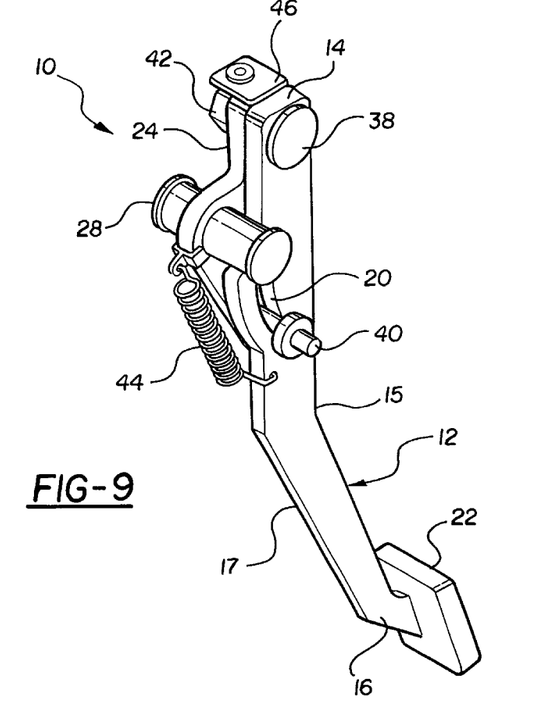
FIG. 9 is a side perspective view of an adjustable pedal assembly according to the subject invention.
Figure 10:
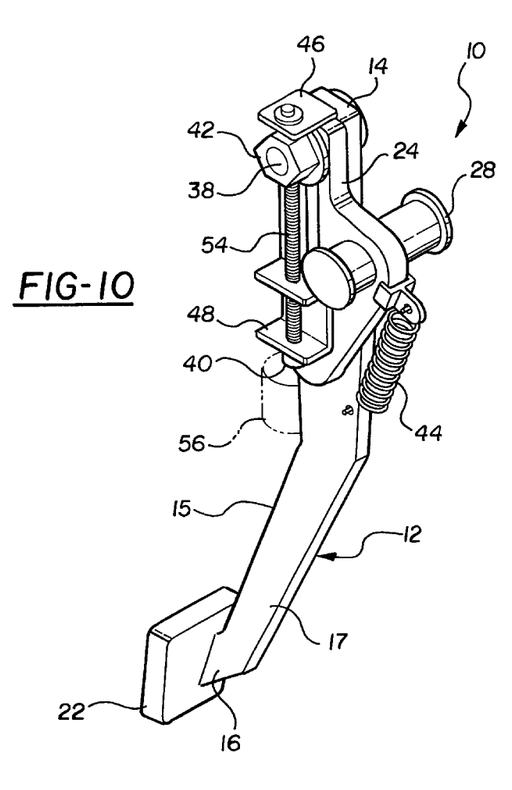
FIG. 10 is an opposite side perspective view of the adjustable pedal assembly of FIG. 9.
Figure 11:
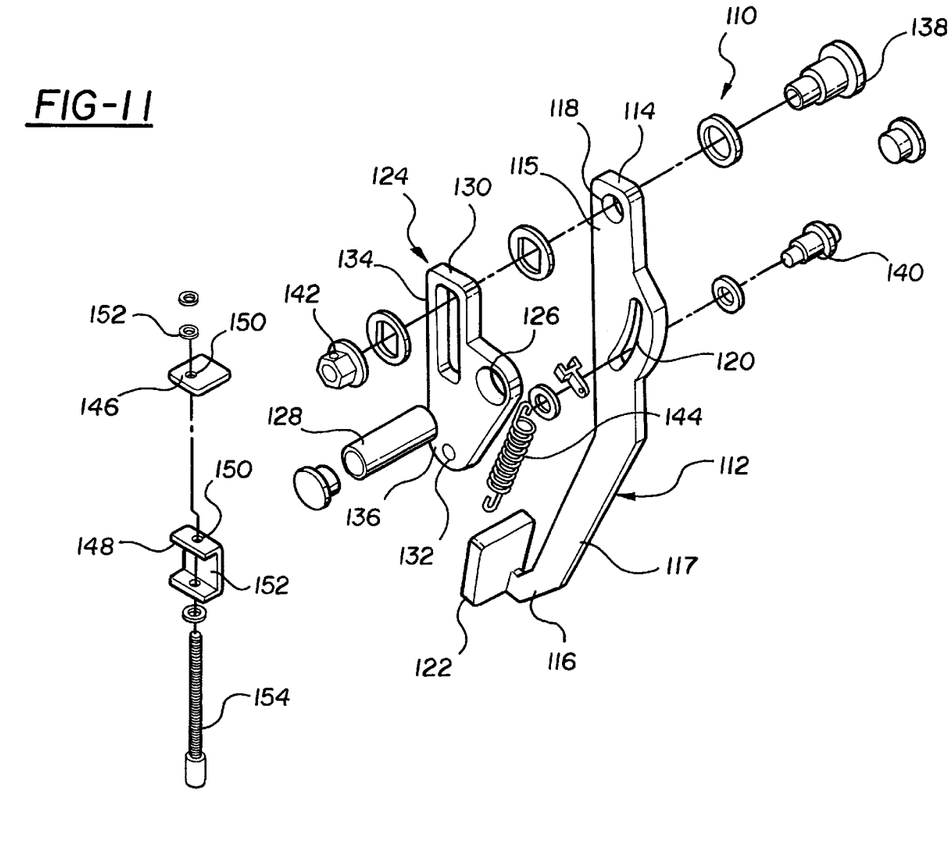
FIG. 11 is an exploded perspective view of the adjustable pedal assembly of FIG. 10.

Referring to FIGS. 9, 10 and 11, the pedal assembly 110 includes an elongated pedal arm 112 extending between a first end 114 and a second distal end 116. The pedal arm 112 includes an opening 118 therethrough adjacent the first end 114 and an elongated slot 120 formed between the first end 114 and the second distal end 116. The elongated slot 120 of FIG. 11 is arcuate shaped or curved between opposing front 115 and near 117 edges of the pedal arm 112 as shown. The elongated slot 120 may be a generally straight slot, curved with a predetermined design radius, angled, or otherwise shaped and configured for translating the movement of the pedal arm 112 during adjustment as will be described in detail hereinbelow. A pedal pad 122 is fixedly mounted to the second distal end 116 of the pedal arm 112 for contact by the foot of a driver of the vehicle (not shown).

The pedal assembly 110 further includes a pivot bracket 124 for supporting the pedal arm 112. The pivot bracket 124 has a through-bore 126 therein for receiving a hollow and cylindrical pivot tube 128 for pivotally securing the pedal assembly 110 to a pivot rod adjacent the floor of the vehicle (not shown). The pivot bracket 124 includes an upper end 130 and a lower end 132. An elongated slot 134 is formed in the pivot bracket 24 and extends generally vertically between the upper end 130 and the lower end 132. A pivot hole 136 is also formed in the pivot bracket 124 adjacent the lower end 132. The pivot bracket 124 is operatively coupled to the pedal arm 112 by a pedal arm pin 138 and a push rod pin 140. More specifically, the pedal arm pin 138 is a threaded cylindrical pin, which is received through the opening 118 in the pedal arm 112 and extends through the elongated slot 134 of the pivot bracket 124. A retainer nut 142 is threaded onto the end of the pedal arm pin 138 to retain the pedal arm pin 138 in the elongated slot 134 and yet allow sliding movement of the pin 138 between the opposing ends of the slot 134. The push rod pin 140 is similarly a cylindrical pin, which is received through the elongated slot 120 in the pedal arm 112 and through the pivot hole 136 in the pivot bracket 124. The push rod pin 140 is retained in the elongated slot 120 and slidable between the opposing ends of the slot 120. A link, cable, or rod, (not shown) may be connected to the end of the push rod pin 140 for attaching the pedal assembly 110 to a convention brake booster assembly, throttle control or clutch mechanism as is commonly known in the art.

A coil spring 144 is interconnected between the pedal arm 112 and the pivot bracket 124 for biasing the pedal arm pin 138 and the push rod pin 140 within the respective slots 134, 120 and toward the forward side of the pedal assembly 110, or the front edge 115 of the pedal arm 112.

The pedal assembly 10 further includes an upper block 146 and a lower block 148 fixedly secured to the pivot bracket 124 adjacent the respective upper 130 and lower 132 ends. Each of the upper and lower blocks 146, 148 include a center aperture 150 extending therethrough for receiving a bushing 152. An elongated, cylindrical and threaded drive screw 154 is rotatably coupled by the bushings 152 to the apertures 150 of each upper and lower block 146, 148. The drive screw 154 is also threaded through the retainer nut 142, which is seated on the drive screw 154 between the upper 146 and lower 148 blocks.

The pedal assembly 110 also includes an electrically powered drive motor 156 connected to the end of the drive screw 154 adjacent the lower block 148, as shown in FIG. 10, for rotating the drive screw 154 in both the clockwise and counterclockwise directions.

Figure 12:
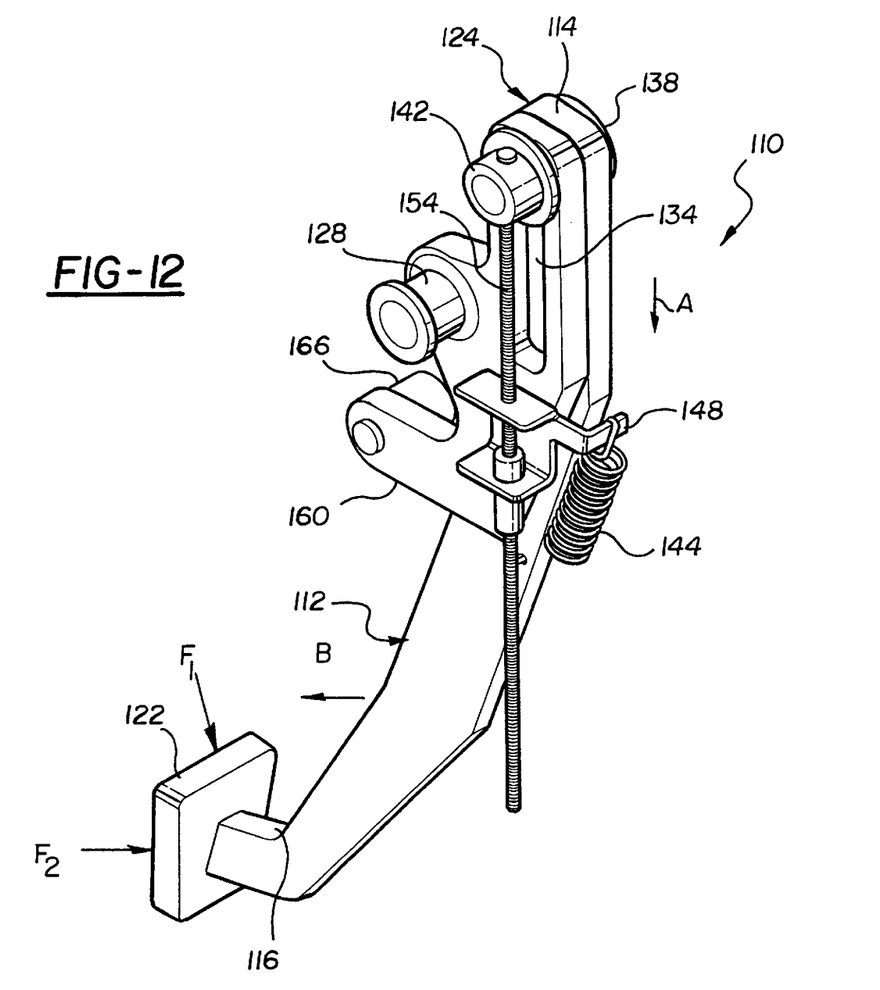
FIG. 12 is a perspective view of an alternative adjustable pedal assembly.
Figure 13:
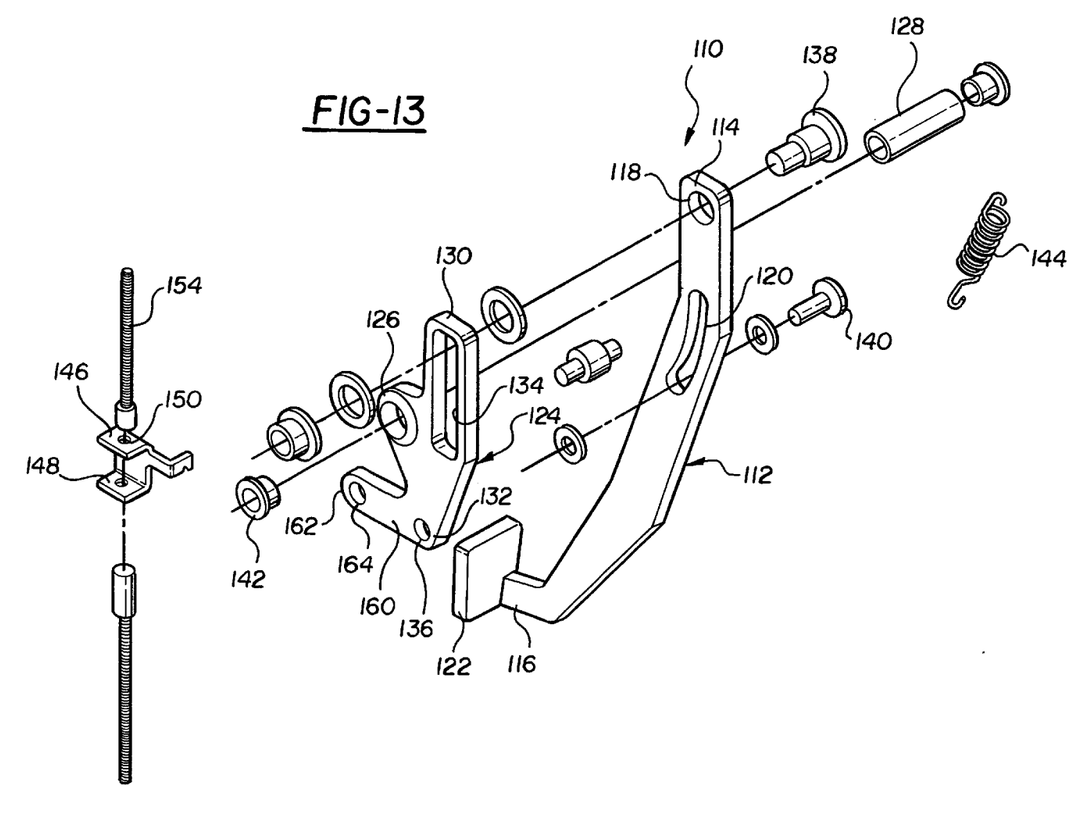
FIG. 13 is an exploded perspective view of the adjustable pedal assembly of FIG. 12.

Referring to FIGS. 12 and 13, an alternative embodiment of the adjustable pedal assembly 110 is shown. The pedal assembly 110 of FIGS. 12 and 13 includes a pivot bracket 124 with a lower arm 160 projecting outwardly, or forwardly, from the lower end 132 of the bracket 124 to a distal end 162. A through-bore 164 is formed in the distal end 162 of the lower arm 160 for receiving a push rod 166. The link, cable or rod for actuating and controlling the brake booster, throttle or clutch mechanism is connected to the push rod 166 of the lower arm 160 in the alternative embodiment rather than the push rod pin 140 of the embodiment of FIGS. 9-11. A separate push rod pin 140, or slot pin, is still received through the slot 120 in the pedal arm 112 and the opening 136 in the pivot bracket 124.

Figure 14:
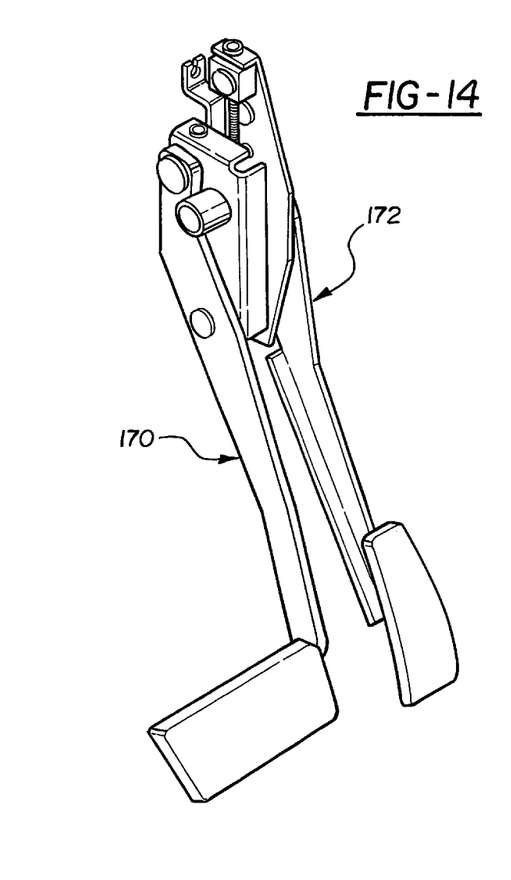
FIG. 14 is a side perspective view of an alternative adjustable brake pedal assembly and an adjustable accelerator pedal assembly.
Figure 15:
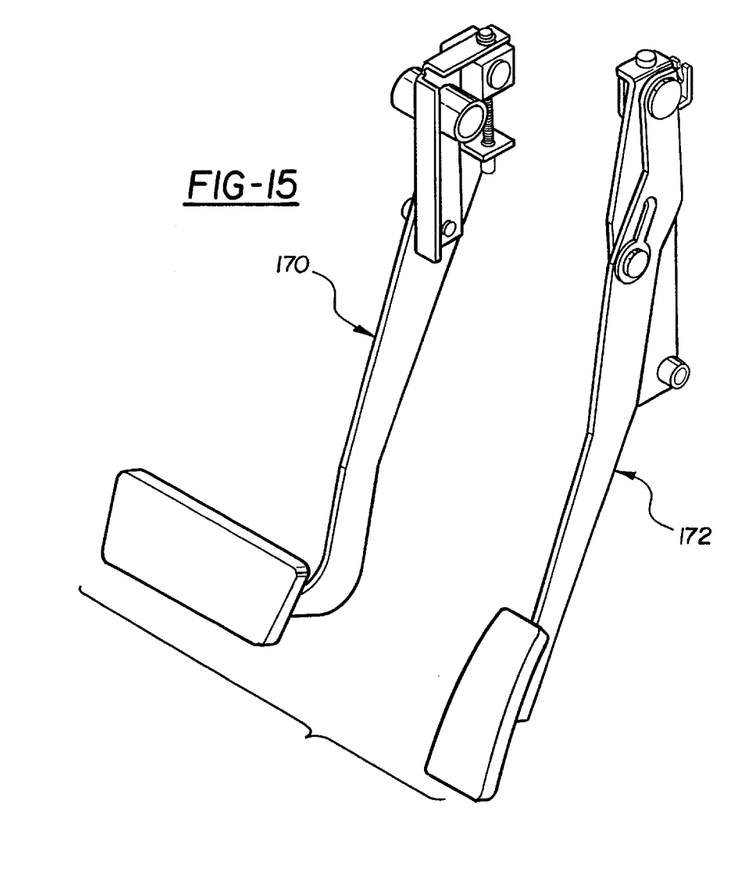
FIG. 15 is an opposite side perspective view of the adjustable pedal assemblies of FIG. 14.
Figure 16:
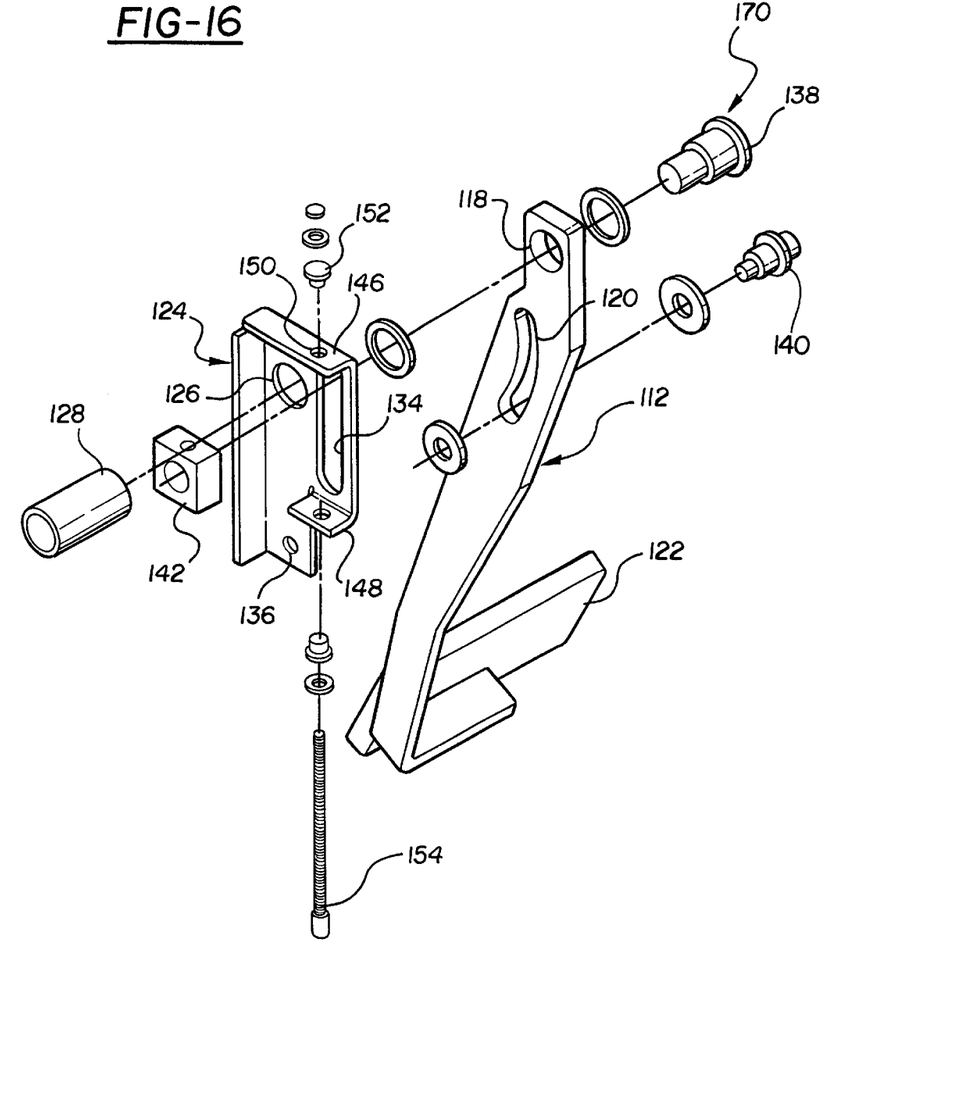
FIG. 16 is an exploded perspective view of the adjustable brake pedal assembly of FIG. 14.

Referring to FIGS. 14 and 15, an adjustable brake pedal assembly is shown at 170 and an adjustable accelerator pedal assembly is shown at 172. Each of the pedal assemblies 170, 172 include the components of the pedal assembly 110 of FIGS. 8-13. Thus, it is appreciated that the adjustable pedal mechanism may be utilized for adjusting the position of any type of pedal, i.e. a brake pedal, accelerator pedal, clutch pedal, or the like. The respective drive motors of each of the pedals 170, 172 may be electrically interconnected such that the pedals 170, 172 are simultaneous adjusted for equal positioning relative to the driver. FIG. 16 discloses an exploded view of the adjustable brake pedal assembly 170 of FIGS. 14 and 15.

In operation, referring to FIGS. 8-13, the pedal assembly 110 is adjustable relative to the fixed pivot tube 128 in both a horizontal and vertical direction to accommodate various sized drivers of the vehicle. The pedal assembly 110 is shown in a normal, or forward, position, which would be adjusted with the pedal assembly spaced furthest from the seat or driver of the vehicle. To adjust the pedal assembly 110, the electric drive motor 156 is actuated to rotate the drive screw 154 in either the clockwise or counterclockwise direction in order to move the pedal assembly from the normal position to a rearward position closer to the seat or driver of the vehicle. When the drive screw 154 is rotated by the drive motor 156, the retainer nut 142 is forced to travel along the longitudinal length of the threaded drive screw 154 toward the lower block 148. The retainer nut 142 is secured to the pedal arm pin 138 which passes through the elongated slot 134 in the pivot bracket 124 and the opening 18 in the pedal arm 112. Therefore, the retainer nut 142 forces the pedal arm pin 138 to slide vertically along the elongated slot 134 from the upper end toward the lower end in the direction of the arrow A in FIG. 12. The pedal arm pin 138 forces the first end 114 of the pedal arm 112 to also travel vertically downwardly in the direction of the elongated slot 134. As the pedal arm 112 travels downwardly along the path of the elongated slot 134, the push rod pin 140 travels along the elongated curved slot 120. That is, the push rods pin 140 is fixedly secured to the pivot bracket 124 and slidably received in the elongated curved slot 120 in the pedal arm 112. Therefore, as the pedal arm pin 138 forces the first, or upper end, of the pedal arm 112 downwardly, the curved slot 120 forces the lower end 116 of the pedal arm 112 forwardly in the direction of arrow B in FIG. 12, which positions the pedal pad 122 closer to the driver of the vehicle. As previously discussed, the elongated slot 120 may be shaped in any desired manner to control, direct or manipulate the movement of the lower end of the pedal arm 112 in response to the pedal arm pin 138 forcing the pedal arm 112 downwardly along the elongated vertical slot 134. For example, the more the slot 120 is orientated in the horizontal direction, or plane, the more linear or horizontal travel of the pedal arm 112.

Additionally, one advantage of a curved slot 120 is that the lower end 116 of the pedal arm 112 will travel along an arcuate path. This arcuate path of travel maintains the pedal pad 122 in a position, which maintains a direct tangential force by the driver regardless of the position of the pedal 112. That is, a driver with shorter legs which adjusts the position of the pedal assembly 110 forwardly and closer to the driver or seat will also be applying a force on the pedal pad 122 from a more upright or vertical angle, as illustrated at F1, than would a driver with longer legs having the pedal 110 moved full rearward to the normal position, as illustrated at F2.

The pedal arm 112 is adjusted and moved toward the normal position by simply reversing the direction of the drive motor 156.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed:

1. An adjustable pedal assembly for a vehicle comprising:

a bracket for mounting said adjustable pedal assembly to the vehicle;

a pivot link pivotally mounted to said bracket, said pivot link having a first guide slot and a first pin secured to said pivot link, said pivot link defining a pivot axis fixed relative to said bracket;

a pedal having an arm, said arm having a second guide slot and a second pin secured to said pedal, said second guide slot receiving said first pin in sliding engagement, said first guide slot receiving said second pin in sliding engagement, wherein said first guide slot and said second guide slot define a first axis and a second longitudinal axis whereby said first and second axes extend obliquely with respect to each other; and a drive assembly extending between said first pin and said second pin and operable to effect sliding relative movement of said pedal arm relative to said pivot link to extend and retract said pedal, wherein said drive assembly includes a drive screw extending out of said first pin and extending through and threadingly engaging said second pin.

2. An adjustable pedal assembly as set forth in claim 1 wherein said first and second guide slots define an angle extending obliquely with respect to each other.

3. An adjustable pedal assembly as set forth in claim 2 wherein said first and second guide slots define an angle extending therebetween greater than ninety degrees.

4. An adjustable pedal assembly as set forth in claim 3 wherein said first guide slot is linear.

5. An adjustable pedal assembly as set forth in claim 4 wherein said second guide slot is linear.

6. An adjustable pedal assembly as set forth in claim 5 wherein said drive includes a motor fixedly secured to said bracket, said motor turning said drive screw.

7. An adjustable pedal assembly as set forth in claim 6 wherein said drive further includes a flexible core element extending between said motor and said drive screw.

8. An adjustable pedal assembly as set forth in claim 7 wherein said flexible core element extends through a curved path.

* * * * *